United States Patent [19]
Fields et al.

[11] Patent Number: 5,729,768
[45] Date of Patent: Mar. 17, 1998

[54] ONE-TIME USE CAMERA PROVIDED WITH FRANGIBLE FLASH SUPPORT DESTROYED BY OPENING LIGHTTIGHT ENCLOSURE TO REMOVE EXPOSED FILM

[75] Inventors: Roger Alan Fields, Pittsford; Stanley Ward Stephenson, III, Spencerport, both of N.Y.

[73] Assignee: Eastman Kodak Company, Rochester, N.Y.

[21] Appl. No.: 627,297

[22] Filed: Apr. 3, 1996

[51] Int. Cl.$^6$ .................... G03B 17/02; G03B 15/05
[52] U.S. Cl. .................... 396/6; 396/178; 396/535
[58] Field of Search ................ 396/6, 535, 536, 396/178

[56] References Cited

U.S. PATENT DOCUMENTS

| | | | |
|---|---|---|---|
| 2,152,081 | 3/1939 | Nelson | 292/147 |
| 2,196,740 | 4/1940 | Ross | 217/57 |
| 5,319,404 | 6/1994 | Swayze | 354/149.11 |
| 5,506,646 | 4/1996 | Dunsmore | 354/149.11 |

*Primary Examiner*—Safet Metjahic
*Assistant Examiner*—Eric Nelson
*Attorney, Agent, or Firm*—Roger A. Fields

[57] ABSTRACT

A one-time-use camera comprises a film cartridge and a lighttight enclosure which contains the film cartridge and can be opened to remove the film cartridge. Further, the one-time-use camera has a flash unit which is characterized in that a frangible support device for the flash unit is located to be destroyed when the lighttight enclosure is opened to remove the film cartridge.

9 Claims, 4 Drawing Sheets

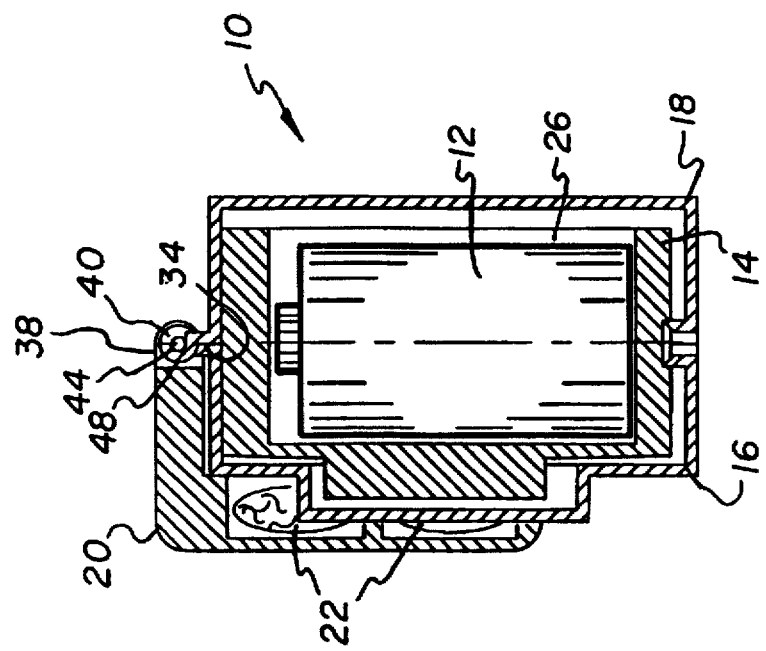
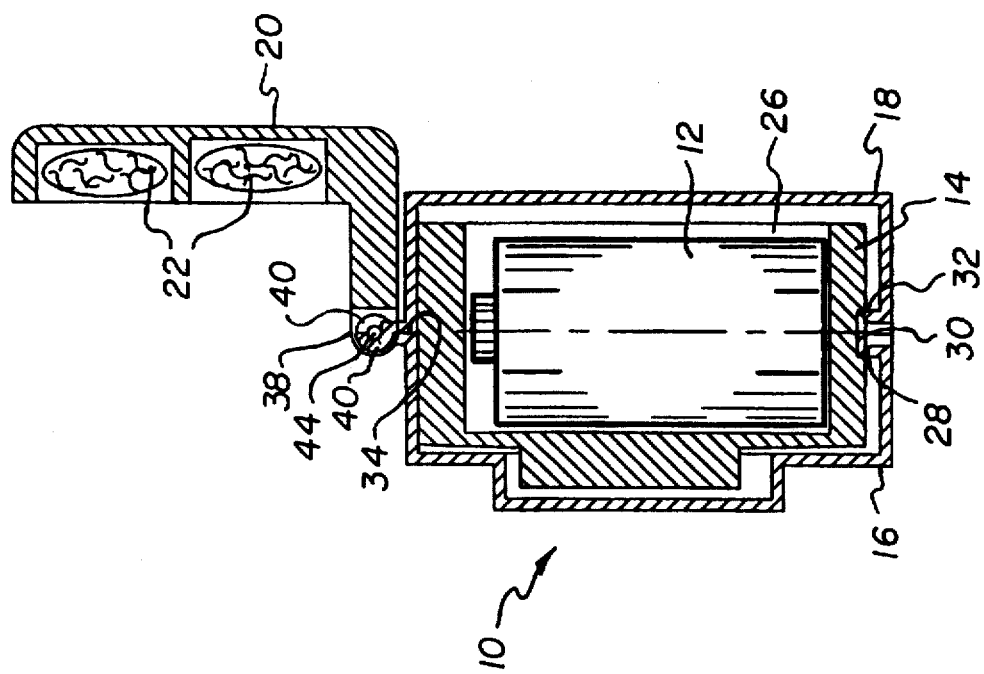

ONE-TIME USE CAMERA PROVIDED WITH FRANGIBLE FLASH SUPPORT DESTROYED BY OPENING LIGHTTIGHT ENCLOSURE TO REMOVE EXPOSED FILM

FIELD OF THE INVENTION

The invention relates generally to the field of photography, and in particular to one-time-use or single-use cameras. More specifically, the invention relates to a one-time-use camera provided with a frangible flash support that is destroyed when the camera's lighttight enclosure is opened to remove the exposed film for processing.

BACKGROUND OF THE INVENTION

Film and cameras that are all in one, commonly referred to as one-time-use or single-use cameras, have recently become well known. Typically, the one-time-use camera is a simple point-and-shoot type comprising a plastic main body portion which supports a fixed-focus taking lens, a film metering mechanism, a manual film advance thumbwheel, a single-blade shutter, a manual shutter release button, a frame counter for indicating the number of exposures remaining for picture-taking, a direct see-through viewfinder, and a fixed electronic flash unit. A pair of front and rear plastic cover portions house the main body portion between them to form a lighttight camera unit. Alternatively, the main body portion may be connected only with a rear cover portion to form the lighttight camera unit. A decorative cardboard outer box contains the lighttight camera unit and has respective openings for the taking lens, the shutter release button, the film advance thumbwheel, the viewfinder, the frame counter, and the fixed flash unit.

At the manufacturer, the main body portion is loaded with a film cartridge and the front and rear cover portions are connected to each other and/or to the main body portion to assemble the lighttight camera unit. Then, an exposed end of a supply spool in the main body portion is rotated to factory prewind substantially the entire length of an unexposed filmstrip from the film cartridge onto the supply spool. Lastly, the outer box is placed on the lighttight camera unit.

During picture-taking, after the photographer takes a picture, he or she manually rotates the thumbwheel in engagement with a take-up spool inside the cartridge to rewind the exposed frame into the cartridge. The rewinding movement of the filmstrip the equivalent of slightly more than one frame width rotates a metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take a picture pivots the metering lever out of engagement with the thumbwheel. When the maximum number of exposures available on the filmstrip are exposed and the filmstrip is completely rewound into the film cartridge, the one-time-use camera is given to a photofinisher who tears the outer box off the lighttight camera unit, separates the rear cover portion from the main body portion at a common seam, and removes the film cartridge with the filmstrip from the main body portion. Then, he removes the filmstrip from the film cartridge to develop the negatives and make prints for the customer, and he usually forwards the used camera parts to the camera manufacturer for recycling, i.e. re-manufacture.

During recycling, the main body portion is re-loaded with a fresh cartridge containing an unexposed filmstrip, and the front and rear cover portions are re-assembled with the main body portion to form the lighttight camera unit. Then, the exposed end of the supply spool in the main body portion is again rotated to factory prewind substantially the entire length of the unexposed filmstrip from the film cartridge onto the supply spool. Lastly, a new outer box is placed on the lighttight camera unit.

There is a need recognized in the industry to prevent unauthorized recycling of one-time-use cameras in order to maintain camera quality. Unauthorized recycled cameras may be of lesser quality than authorized recycled cameras. This problem is described in prior art U.S. Pat. No. 4,890,130, issued Dec. 26, 1989. The patent offers as a solution providing a line of weakness on the rear cover portion which destroys the rear cover portion when the lighttight camera unit is opened to remove the film cartridge from the main body portion.

SUMMARY OF THE INVENTION

A one-time-use camera comprising a film cartridge, a lighttight enclosure which contains the film cartridge and can be opened to remove the film cartridge, and a flash unit, is characterized in that:

a frangible support for the flash unit is located to be destroyed when the lighttight enclosure is opened to remove the film cartridge.

Preferably, the flash unit is pivotable away from the lighttight enclosure for picture-taking. In addition, the frangible support is located substantially at a common separation seam between a main body portion and a rear cover portion of the one-time-use camera, or between the rear cover portion and a front cover portion of the one-time-use camera, to be destroyed when at least one of the cover portions is removed.

BRIEF DESCRIPTION OF THE DRAWINGS

FIG. 2 is a side elevation sectional view of the one-time-use camera, showing a pivotal flash unit in an operative position;

FIG. 3 is a side elevation sectional view of the one-time-use camera, showing the pivotal flash unit in an inoperative position;

DETAILED DESCRIPTION OF THE INVENTION

Figure 1:
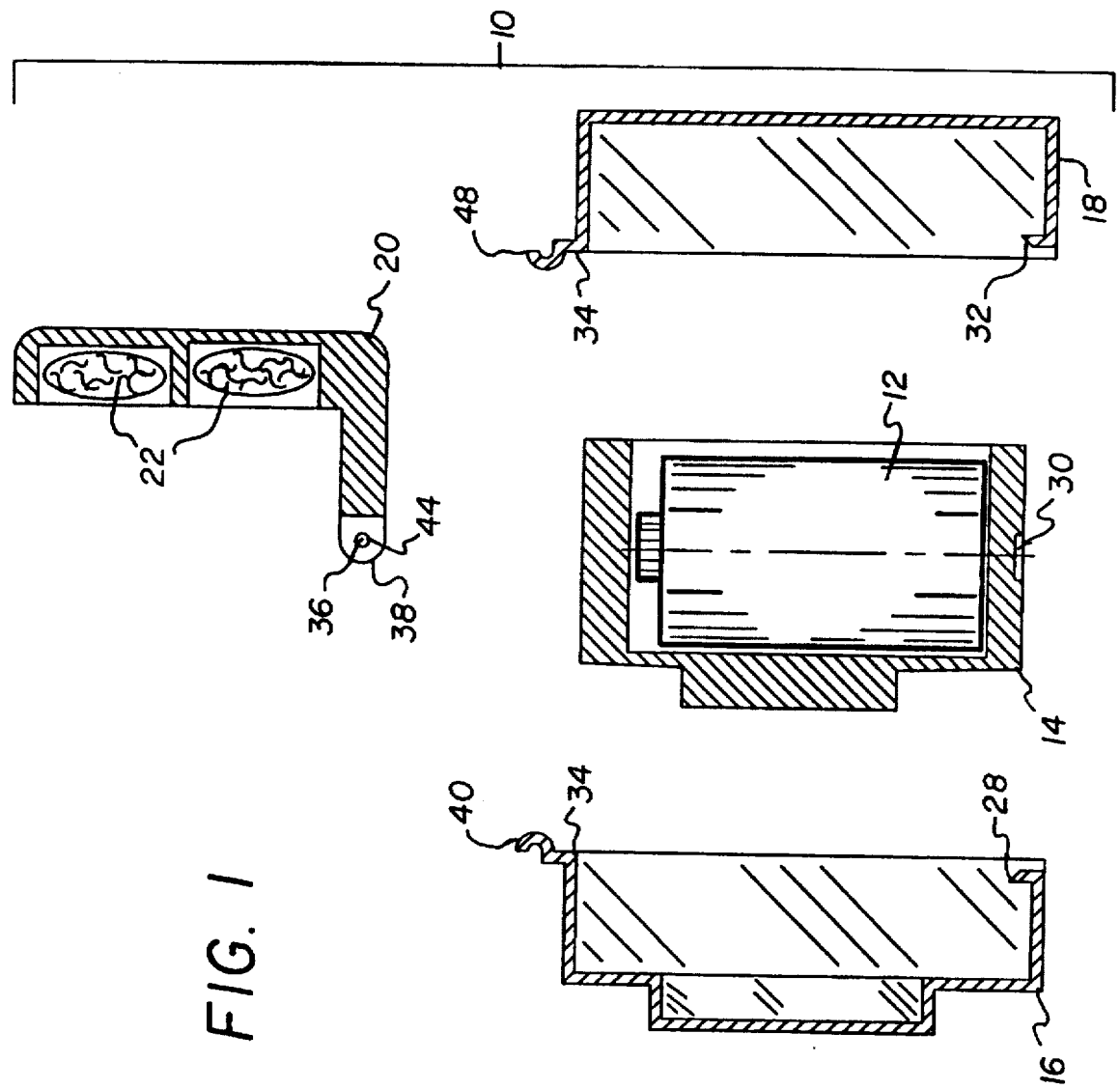
FIG. 1 is a side elevation sectional view of a one-time-use camera according to a preferred embodiment of the invention, showing the one-time-use camera separated into its individual parts.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a one-time-use 10 camera comprising a film cartridge 12, an open-back main body portion 14 which contains the film cartridge, a front cover portion 16 for the main body portion, a rear cover portion 18 for the main body portion, and a flash unit 20 including eight flash bulbs 22 and a viewfinder opening 24. The rear cover portion 18 combines with the main body portion 14 to form a lighttight enclosure 26. See FIGS. 2 and 3.

The front cover portion 16 has a resilient hook 28 that is received forwardly in a notch 30 in the main body portion 12 to connect the front cover portion to the main body portion, and the rear cover portion 18 has a resilient hook 32 that is received rearwardly in the notch to connect the rear cover portion to the main body portion. The two cover portions 16 and 18, connected to the main body portion 14, have a common separation seam or gap 34 along which they can be forcibly separated from the main body portion. See FIGS. 1, 2 and 5.

Figure 4:
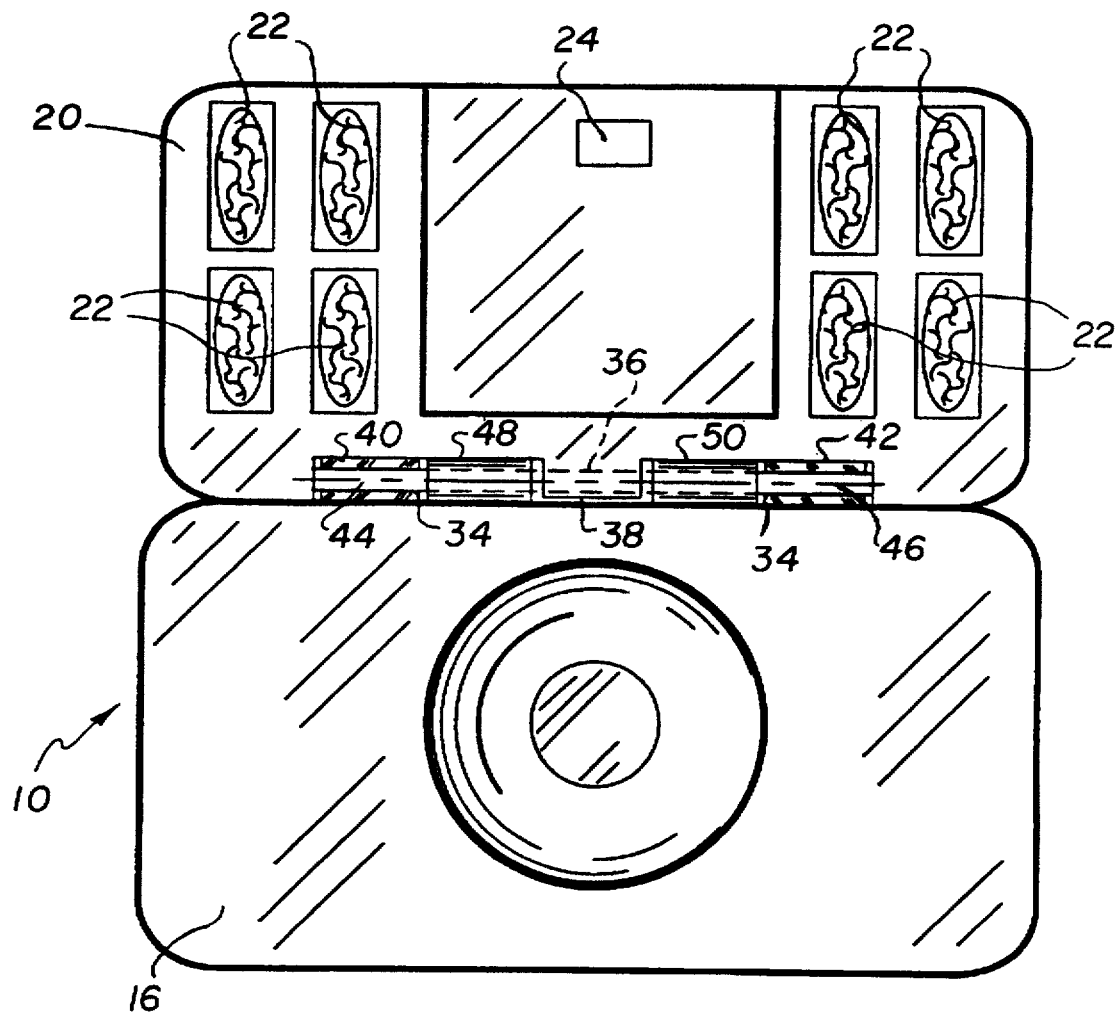
FIG. 4 is a front elevation view of the one-time-use camera, showing the pivotal flash unit in its operative position.

The flash unit 20 includes a pivot pin 36 that, as shown in FIG. 4, longitudinally extends in opposite directions from a base portion 38 of the flash unit. The front cover portion 16 has an integral pair of identical frangible half-rings or pin holders 40 and 42, located at opposite sides of the base portion 38, that are open frontward to receive respective portions 44 and 46 of the pivot pin 36. See FIGS. 1–4. The rear cover portion 18 has an integral pair of identical frangible half-rings or pin holders 48 and 50, located at opposite sides of the base portion 38, that are open rearward to receive the pin portions 44 and 46. The pin holders 40 and 48 with the pin portion 44 form a hinge joint for the flash unit 20 adjacent the separation seam or gap 34. The pin holders 42 and 50 with the pin portion 46 form a hinge joint for the flash unit 20 adjacent the separation seam or gap 34. As shown in FIGS. 3 and 4, the flash unit 20 is ,thus, supported for swinging movement between an operative position extended from the front and rear covers 16 and 18 for picture-taking and an inoperative position folded against the front cover.

Figure 5:
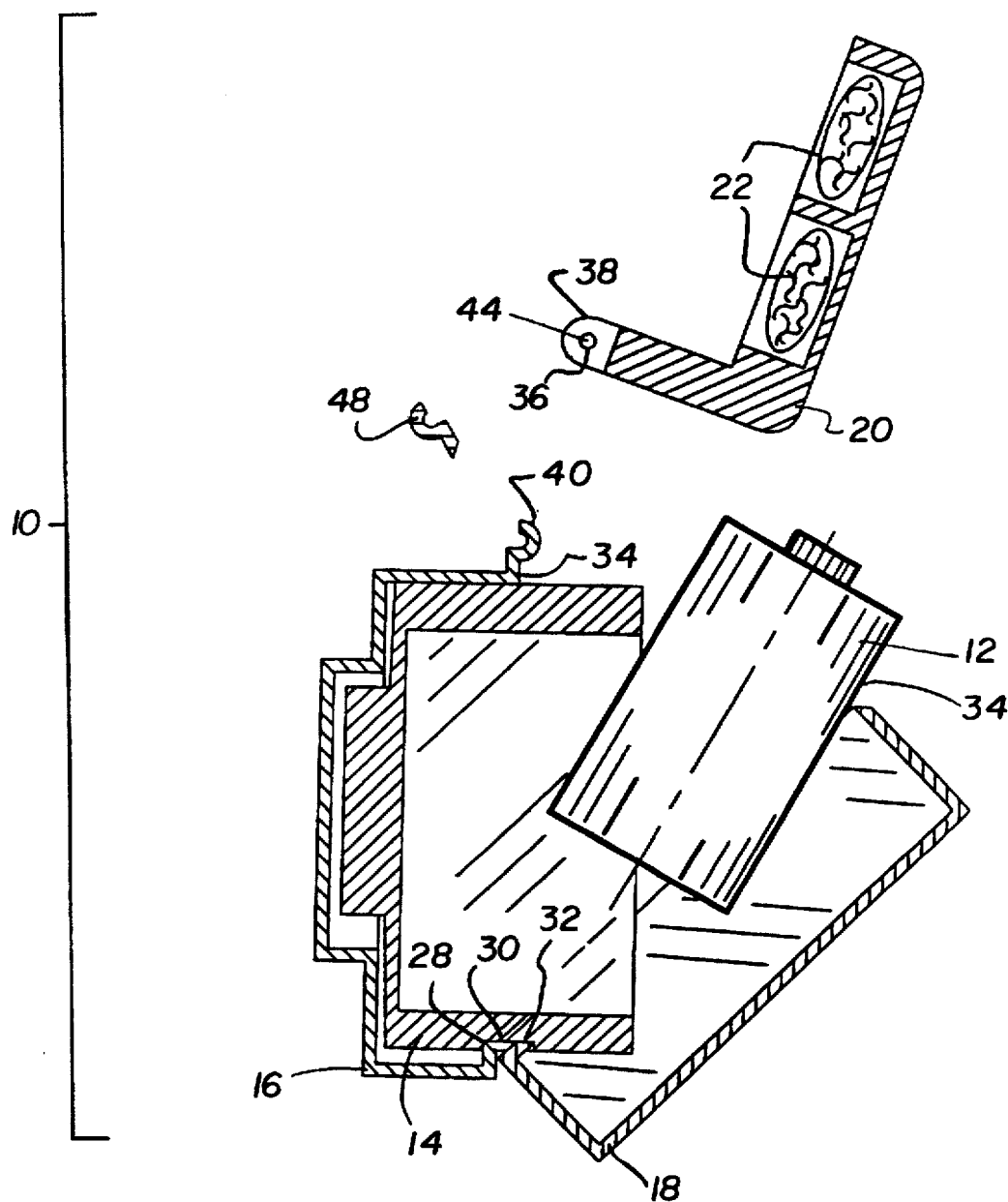
FIG. 5 is a side elevation sectional view of the one-time-use camera, showing a frangible pivot support for the flash unit destroyed when the camera's lighttight enclosure is opened to remove the exposed film.

When the rear cover portion 18 is forcibly separated from the main body portion 14, as shown in FIG. 5, the pin holders 48 and 50 (only 48 shown) are broken off the rear cover portion.

The invention has been described with reference to a preferred embodiment. However, it will be appreciated that variations and modifications can be effected by a person of ordinary skill in the art without departing from the scope of the invention.

PARTS LIST 10. one-time-use camera
12. film cartridge
14. main body portion
16. front cover portion
18. rear cover portion
20. flash unit
22. flash bulbs
24. viewfinder opening
26. lighttight enclosure
28. hook
30. notch
32. hook
34. separation seam or gap
36. pivot pin
38. base portion
40. pin holder
42. pin holder
44. pin portion
46. pin portion
48. pin holder
50. pin holder

We claim:

1. A one-time-use camera comprising a film cartridge, a lighttight enclosure which contains said film cartridge and can be opened to remove the film cartridge, and a flash unit, is characterized in that:

a frangible support for said flash unit is located to be destroyed whenever said lighttight enclosure is opened to remove said film cartridge, so that the lighttight enclosure cannot be opened to remove the film cartridge without destroying the frangible support.

2. A one-time-use camera as recited in claim 1, wherein said frangible support supports said flash unit for movement between an operative position extended from said lighttight enclosure for picture-taking and an inoperative position not extended from the lighttight enclosure.

3. A one-time-use camera as recited in claim 2, wherein said flash unit includes a pivot pin, and said frangible support includes a frangible pin holder which with said pivot pin forms a hinge joint for said flash unit that is destroyed whenever said lighttight enclosure is opened to remove said film cartridge.

4. A one-time-use camera as recited in claim 1, wherein said lighttight enclosure includes a main body portion for said film cartridge and an outer cover portion which can be forcibly separated from said main body portion to remove the film cartridge, and said frangible support is located to be destroyed whenever said cover portion is forcibly separated from the main body portion.

5. A one-time-use camera comprising a film cartridge, a lighttight enclosure which contains said film cartridge and can be opened to remove the film cartridge, and a flash unit, is characterized in that:

a frangible support for said flash unit is located to be destroyed when said lighttight enclosure is opened to remove said film cartridge;

said lighttight enclosure includes a main body portion for said film cartridge and a rear cover portion;

a front cover portion and said rear cover portion have a common separation seam along which they can be separated from each other; and said frangible support is located adjacent said separation seam to be destroyed when said front and rear cover portions are separated along the separation seam.

6. A one-time-use camera as recited in claim 5, wherein said frangible support supports said flash unit adjacent said common separation seam for swinging movement between an operative position extended from said front and rear cover portions for picture-taking and an inoperative position folded against the front cover portion.

7. A one-time-use camera as recited in claim 6, wherein said flash unit includes a pivot pin, and said frangible support includes a pair of pin holders which with said pivot pin form a hinge joint for the flash unit adjacent said common separation seam.

8. A one-time-use camera as recited in claim 7, wherein respective ones of said pin holders are located on said front and rear cover portions.

9. A one-time-use camera as recited in claim 8, wherein said pin holder on said front cover portion is a half-ring that is open frontward, and said pin holder on said rear cover is a half-ring that is open rearward.

\* \* \* \* \*